US00RE43575E

(19) United States
(12) Reissued Patent
Na et al.

(10) Patent Number: US RE43,575 E
(45) Date of Reissued Patent: Aug. 14, 2012

(54) LIQUID CRYSTAL DISPLAY PANELS HAVING CONTROL LINES WITH UNIFORM RESISTANCE

(75) Inventors: Byoung-Sun Na, Kyungki-do (KR); Dong-Gyu Kim, Kyungki-do (KR); Woon-Yong Park, Kyungki-do (KR)

(73) Assignee: Samsung Electronics Co., Ltd. (KR)

(21) Appl. No.: 10/218,968

(22) Filed: Aug. 14, 2002

Related U.S. Patent Documents

Reissue of:
(64) Patent No.: 6,104,465
Issued: Aug. 15, 2000
Appl. No.: 08/774,505
Filed: Dec. 30, 1996

(30) Foreign Application Priority Data

Dec. 30, 1995 (KR) ..... 95-68237

(51) Int. Cl.
*G02F 1/1345* (2006.01)
(52) U.S. Cl. ..... 349/152; 349/151
(58) Field of Classification Search ..... 349/149, 349/151–152
See application file for complete search history.

(56) References Cited

U.S. PATENT DOCUMENTS

| | | | | |
|---|---|---|---|---|
| 3,593,068 | A * | 7/1971 | Rosier | 257/752 |
| 4,446,355 | A * | 5/1984 | Sato et al. | 347/208 |
| 4,478,076 | A * | 10/1984 | Bohrer | 73/204.16 |
| 4,501,144 | A * | 2/1985 | Higashi et al. | 73/204.26 |
| 5,033,824 | A | 7/1991 | Bohmer | |
| 5,334,860 | A * | 8/1994 | Naito | 257/59 |
| 5,499,131 | A | 3/1996 | Kim | |
| 5,757,450 | A | 5/1998 | Fujii et al. | |

* cited by examiner

*Primary Examiner* — James Dudek
(74) *Attorney, Agent, or Firm* — Innovation Counsel LLP

(57) ABSTRACT

A liquid crystal display (LCD) panel includes a substrate, a plurality of parallel control lines on the substrate, and a bonding pad area on the substrate having a plurality of bonding pads therein. A respective one of a plurality of interconnecting conductors connect a respective bonding pad of the bonding pad area to a respective one of the plurality of parallel control lines, each of the plurality of interconnecting conductors having a uniform resistance. According to embodiments of the invention, an interconnecting conductor of the plurality of interconnecting conductors may include a material selected to provide the uniform resistance. The interconnecting conductor may include a first portion including a first material having a first resistivity and a second portion including a second material having a second resistivity different from the first resistivity. The first and second portions may have respective first and second lengths selected to provide the uniform resistance. According to other embodiments, an interconnecting conductor of the plurality of interconnecting conductors may have a width selected to provide the uniform resistance. In one embodiment, the plurality of interconnecting conductors have a resistivity per unit length associated therewith and extend from the bonding pad area in a fanned configuration, with the resistivity of the interconnecting conductors increasing toward a medial portion of the fanned configuration. The width of the interconnecting conductors may decrease towards the medial portion of the fanned configuration to produce the desired resistivity. According to other embodiments, an interconnecting conductor of the plurality of interconnecting conductors has a length selected to provide the uniform resistance. In one embodiment, the interconnecting conductor has a serpentine portion to provide the desired length.

49 Claims, 4 Drawing Sheets

LIQUID CRYSTAL DISPLAY PANELS HAVING CONTROL LINES WITH UNIFORM RESISTANCE

Matter enclosed in heavy brackets [ ] appears in the original patent but forms no part of this reissue specification; matter printed in italics indicates the additions made by reissue.

FIELD OF THE INVENTION

The present invention relates to liquid crystal displays (LCDs), more particularly, to panels for LCDs.

BACKGROUND OF THE INVENTION

Typically, a liquid crystal display (LCD) panel includes a plurality of data lines and gate lines, the data lines being perpendicular to the gate lines. A plurality of pixel electrodes and a plurality of thin film transistors are formed in an active area in which the data lines and the gate lines typically cross each other at right angles.

The data lines and the gate lines typically extend out of the active area for applying signals from an integrated circuit driver. A plurality of pads are formed in an out-lead bonding (OLB) pad area near the periphery of the active area. The OLB pad area typically includes a pad block which is used for mounting the integrated circuit driver. The pad block is typically connected to a fan-out block having a plurality of leads formed to connect the gate lines or data lines to the integrated circuit driver at a plurality of bonding sites.

A conventional LCD panel is described in further detail with reference to FIGS. 1-3. As shown in FIG. 1, a conventional LCD panel includes a plurality of data lines 3 and gate lines 2 which cross each other at right angles on a display panel 1. The data 3 lines and the gate 2 lines cross each other in an active area B at which a plurality of pixel electrodes and thin film transistors are formed.

The data lines 3 and the gate lines 2 extend outside of the active area B for connection to integrated circuit drivers. A plurality of pads are formed in pad areas 4 near the periphery of the active area B. In order to connect the gate lines 2 and the data lines 3 to the pads in the pad areas 4, fan-out blocks 6 are formed in an OLB pad area C. The fan-out blocks 6 include a plurality of leads 5 formed so that the extended gate and data lines 2, 3 may be gathered for connection to the pads in the pad areas 4. As illustrated in FIG. 2, a typical fan-out block 6 includes a plurality of leads 5 which run in straight lines and have equal thickness and width.

The resistance of the lead in the conventional LCD may be calculated as follows:

$$R=\rho\times L/S=(\rho\times L)/(T\times W),$$

where ρ, L, S, T and W represent resistivity, length of the lead, cross sectional area of the lead, thickness of the lead and width of the lead, respectively. The resistivity ρ typically is a constant which is dependent on the material from which the lead is fabricated. If the thickness and width of the lead are constant throughout the lead length L, the resistance R varies in proportion to the length L.

According to the conventional configuration illustrated in FIGS. 1-2, the difference in resistance between leads 5 in the fan-out block 6 may generate time differences in signals being carried by the leads. Consequently, image quality of the display may be degraded due to time variation of the signals, especially in large-scale displays. For example, the difference of resistance between leads 5 of the fan-out block 6 connected to a plurality of gate lines 2 may cause a time difference in switching on thin film transistors of the LCD elements, potentially degrading image quality.

SUMMARY OF THE INVENTION

In light of the foregoing, it is an object of the present invention to provide LCD panels which can provide higher image quality.

This and other objects, features and advantages are provided according to the present invention by LCD panels in which conductors interconnecting parallel control lines of an LCD element array to bonding pads of a bonding pad area, e.g., lines of a fan-out block, are configured such that uniform resistance is provided between the bonding pads and the control lines, i.e., such that the interconnecting conductors provide approximately the same resistance between the associated bonding pads and control lines. In this manner, a uniform resistance may be provided between the bonding pad areas and LCD elements in a row of the LCD element array. Uniformity in resistance of the interconnecting conductors may be achieved by various techniques, including such measures as controlling the widths of the interconnecting conductors, including serpentine portions in the conductors to effectively increase the length of the conductors, and including portions of different materials having different resistivities in the conductors to provide the uniform resistance. Combinations of these resistance-controlling measures may also be employed. By providing uniformly resistive connections between the bonding pads and the parallel control lines, signal propagation speed among the control lines can be made more uniform. Accordingly, more uniform operation of the LCD element array may be achieved.

In particular, according to the present invention, a liquid crystal display (LCD) panel includes a substrate, a plurality of parallel control lines on the substrate, and a bonding pad area on the substrate having a plurality of bonding pads therein. A respective one of a plurality of interconnecting conductors connects a respective bonding pad of the bonding pad area to a respective one of the plurality of parallel control lines, the plurality of interconnecting conductors providing a uniform resistance between the bonding pads and the control lines connected thereto.

According to an aspect of the invention, an interconnecting conductor of the plurality of interconnecting conductors includes a material selected to provide the uniform resistance. The interconnecting conductor may include a first portion including a first material having a first resistivity and a second portion including a second material having a second resistivity different from the first resistivity. The first and second portions may have respective first and second lengths selected to provide the uniform resistance. At least one of the first and second portions may include a serpentine portion.

According to another aspect, an interconnecting conductor of the plurality of interconnecting conductors has a width selected to provide the uniform resistance. In one embodiment, the plurality of interconnecting conductors have a resistivity per unit length associated therewith and extend from the bonding pad area in a fanned configuration, with the resistivity of the interconnecting conductors increasing toward a medial portion of the fanned configuration The width of the interconnecting conductors may decrease towards the medial portion of the fanned configuration to produce the desired resistivity.

According to another aspect, an interconnecting conductor of the plurality of interconnecting conductors has a length selected to provide the uniform resistance. In one embodiment, the interconnecting conductor has a serpentine portion to provide the desired length. The interconnecting conductor may have a first straight portion and a second serpentine portion.

According to yet another aspect, an LCD panel includes a substrate, an array of LCD elements including a plurality of rows and columns, and a bonding pad area on the substrate having a plurality of bonding pads therein. A plurality of interconnecting conductors are formed on the substrate, a respective one of which connects a respective bonding pad to a respective LCD element of a row of LCD elements, each of the plurality of interconnecting conductors being configured to provide a uniform resistance between the bonding pad and the LCD element of the one row of LCD elements connected thereto.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
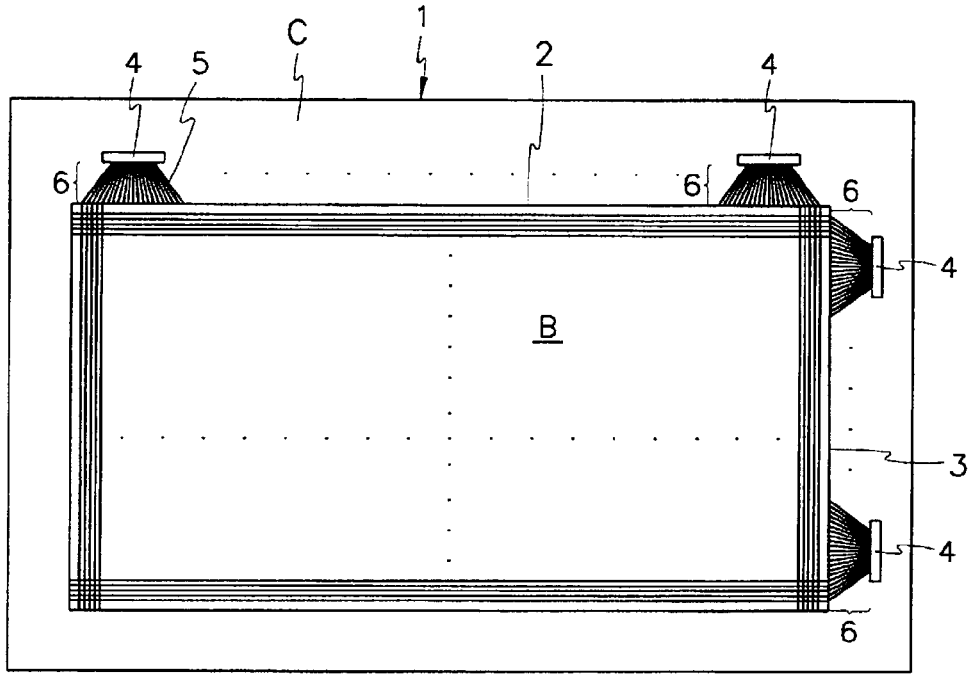
FIG. 1(Prior Art)
FIG. 1 is a planar view illustrating a configuration of a conventional liquid crystal display (LCD) panel.
Figure 2:
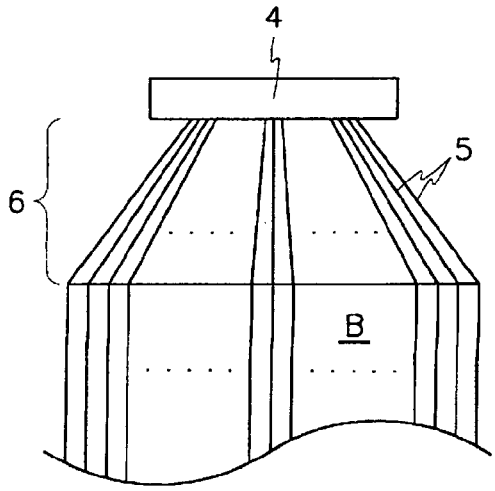
FIG. 2(Prior Art)
FIG. 2 is a planar view illustrating a fan-out block of the conventional LCD panel of FIG. 1.
Figure 3:
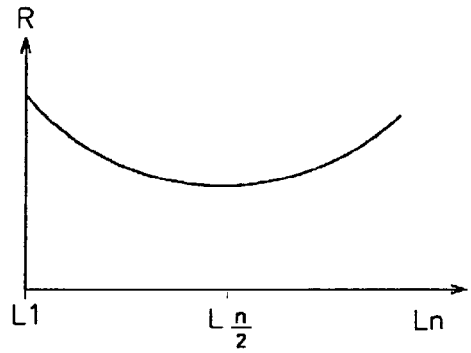
FIG. 3 (Prior Art)
FIG. 3 is a graph illustrating variation of resistances of leads of the fan-out block illustrated in FIG. 2.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity, and like members refer to like elements throughout. In addition, as used herein, "uniform" resistance among a plurality of conductors means that the conductors each provide approximately the same resistance between the element connected thereto; conductors having a "uniform resistance" are not limited to conductors which have uniform resistivity along their length.

Figure 4:
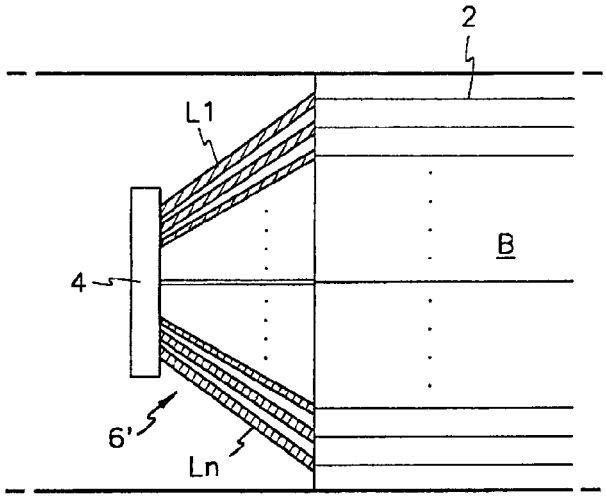
FIG. 4 is a planar view illustrating a fan-out block according to an embodiment of the present invention.
Figure 5:
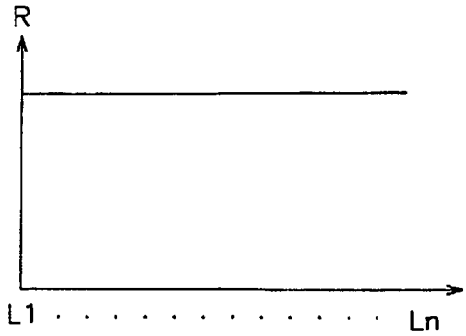
FIG. 5 is a graph illustrating variation of resistances of interconnecting conductors of a fan-out block as shown in FIG. 4.

As shown in FIG. 4, a liquid crystal display (LCD) panel according to an embodiment of the present invention includes a bonding pad area 4 including a plurality of bonding pads connected to a plurality of parallel control lines 2, such as gate lines, data lines, or the like which extend from LCD elements in an active area B. A plurality of interconnecting conductors L1-Ln form a fan-out block 6' for connecting to a plurality of bonding pads in the bonding pad area 4, which in turn may be connected to an integrated circuit (IC) driver. For the illustrated embodiment, the interconnecting conductors 5' have equal thickness but differing widths such that the longest lead is the widest and the shortest lead, located a medial portion of the fan structure, is the narrowest. The widths and lengths of the leads are configured so as to give an equal ratio of length (L) to width (W), thus producing a uniform resistance R for all of the conductors L1-Ln, as graphically illustrated in FIG. 5.

Figure 6:
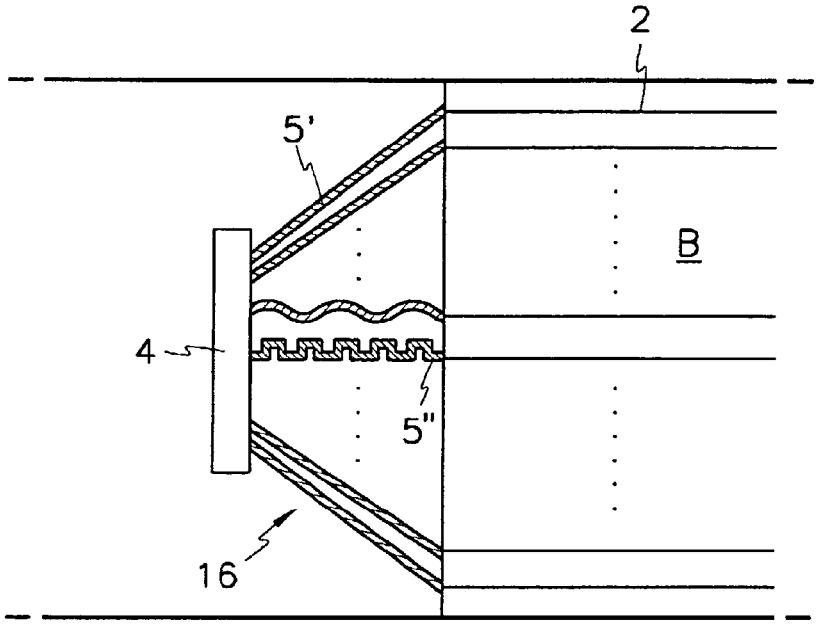
FIG. 6 is a planar view illustrating a fan-out block according to another embodiment of the present invention.

The embodiment illustrated in FIG. 6 addresses situations in which the difference of the length between the longest conductor and the shortest conductor may be excessive, such that in order to provide uniform resistance, the shortest conductor may become so narrow its fabrication may become difficult. Conductors 5' located near outer portions of the fan-out block 16 may have varying widths to produce an equal L/W ratio, while conductors 5" located nearer medial portions of the fan-out block 16 may have a serpentine shape, e.g, a wavelike or ridged shape which effectively increases the length of these conductors. Those skilled in the art will appreciate that portions of the outer conductors 5' may also be shaped in a serpentine fashion.

Figure 7:
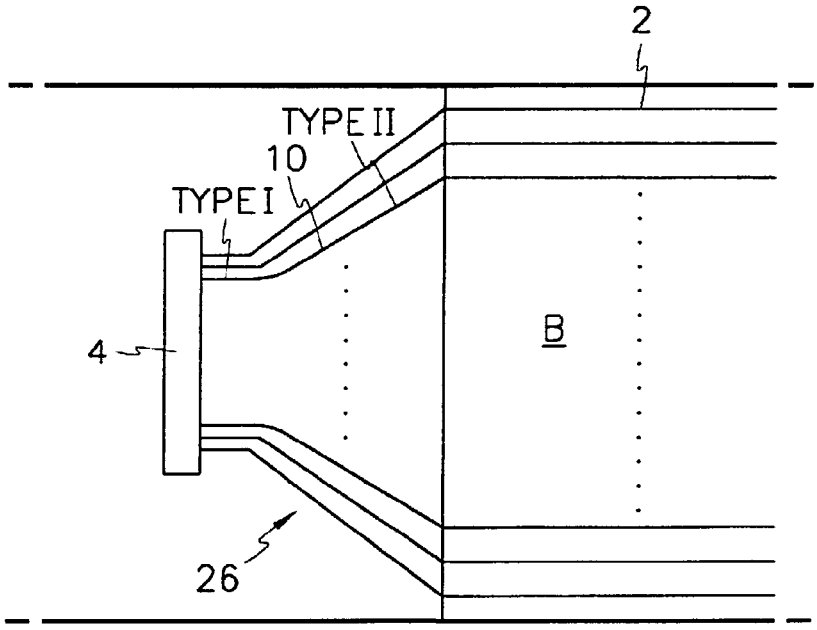
FIG. 7 is a planar view illustrating a fan-out block according to another embodiment of the present invention.

FIG. 7 illustrates yet another embodiment according to the present invention which utilizes another approach for producing uniform resistance in the interconnecting conductors. In the illustrated embodiment, the parallel control lines 2, e.g, gate lines or data lines, are connected to bonding pads of a bonding pad area 4 by a plurality of interconnecting conductors 10 in a fan-out block 26. Each of the conductors 10 includes a first portion formed of a first material TYPE I and a second portion formed of a second material TYPE II, the first and second materials having different resistivities. For example, the first material TYPE I may include chrome, while the second material TYPE II may include aluminum. The lengths of the first and second portions of a conductor 10 may be varied to control the resistance of the conductor 10.

Figure 8:
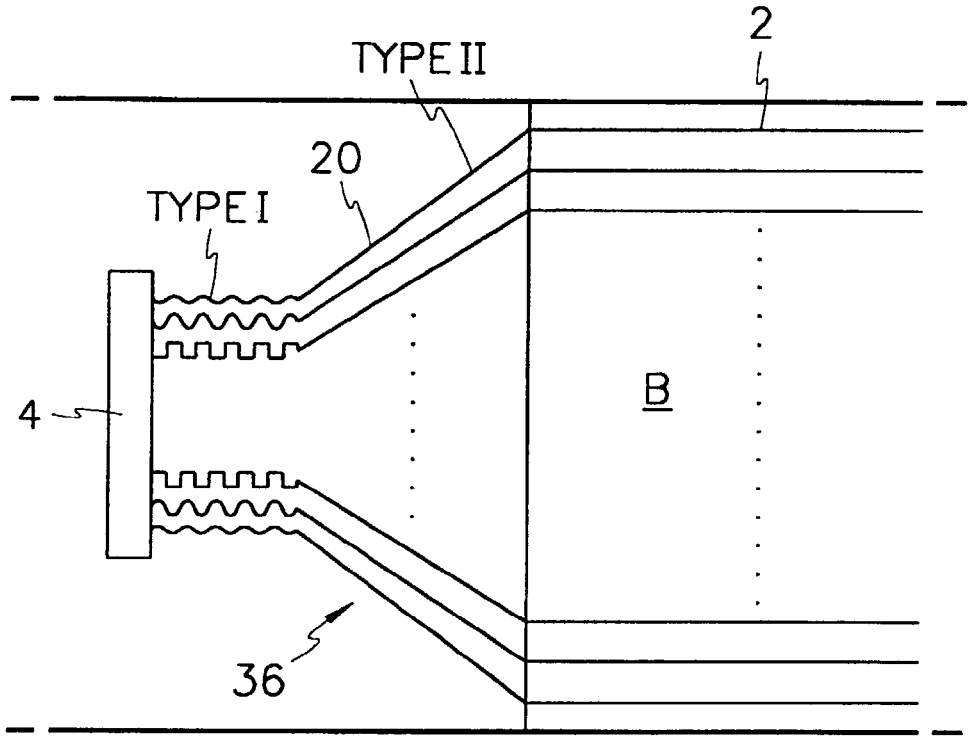
FIG. 8 is a planar view illustrating a fan-out block according to another embodiment of the present invention.

FIG. 8 illustrates an embodiment of the present invention in which the approaches for controlling conductor resistance illustrated in FIGS. 6 and 7 are combined. An interconnecting conductor 20 of the fan-out block 36 may include a serpentine portion of the first material TYPE I and a straight portion of the second material TYPE II. The lengths of the first and second portions and the resistance associated therewith may be related according to the following:

$$K \cdot x + (a - x) = b$$

$$K \geqq b/a1,\ a \geqq x,$$

where each of the symbols K, a, b, a1 and x represent a resistivity ratio of the first material TYPE I to the second material TYPE II, length of the conductor, length of the longest conductor, length of the shortest conductor and length of the first portion formed from the first material TYPE I. The lengths of the first and second portions of the conductors 20 may be adjusted to achieve a uniform resistance for the conductors 20.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A liquid crystal display (LCD) panel having a plurality of pixel electrodes and a plurality of thin film transistors, comprising:

a substrate;

a plurality of parallel control lines connected to the thin film transistors on the substrate;

a bonding pad area on said substrate including a plurality of bonding pads therein; and a plurality of interconnecting conductors, a respective one of said plurality of interconnecting conductors connecting a respective bonding pad in said bonding pad area to a respective one of said plurality of parallel control lines, said plurality of interconnecting conductors providing a uniform resistance between said bonding pads and said control lines connected thereto, wherein said plurality of interconnecting conductors extend from said bonding pad area in a fanned configuration, wherein a respective one of said plurality of conductors has a respective width, and wherein the width of said interconnecting conductors decreases towards a medial portion of said fanned configuration,

*wherein an interconnecting conductor of said plurality of interconnecting conductors comprises a material selected to provide said uniform resistance,*

*wherein an interconnecting conductor of said plurality of interconnecting conductors comprises a first portion and a second portion,*

*wherein said first and second portions have respective first and second lengths selected to provide said uniform resistance, and*

*wherein at least one of said first and second portions comprises a serpentine portion.*

2. An LCD panel according to claim 1, wherein a first distance between a predetermined bonding pad and a first control line is greater than a second distance between a second bonding pad and a second control line.

[3. An LCD panel according to claim 2, wherein an interconnecting conductor of said plurality of interconnecting conductors comprises a material selected to provide said uniform resistance.]

4. An LCD panel according to claim [3] *1*, wherein [an interconnecting conductor of said plurality of interconnecting conductors comprises a] *the* first portion comprising a first material having a first resistivity and [a] *the* second portion comprising a second material having a second resistivity different from said first resistivity.

[5. An LCD panel according to claim 4, wherein said first and second portions have respective first and second lengths selected to provide said uniform resistance.]

[6. An LCD panel according to claim 5, wherein at least one of said first and second portions comprises a serpentine portion.]

7. An LCD panel according to claim 2, wherein an interconnecting conductor of said plurality of interconnecting conductors has a width selected to provide said uniform resistance.

8. An LCD panel according to claim 2, wherein a respective one of said plurality of interconnecting conductors has a respective resistivity per unit length associated therewith, and wherein the resistivity of said interconnecting conductors increases toward said medial portion of said fanned configuration.

9. An LCD panel according to claim 2, wherein an interconnecting conductor of said plurality of interconnecting conductors has a length selected to provide said uniform resistance.

10. An LCD panel according to claim 9, wherein said interconnecting conductor has a serpentine portion.

11. An LCD panel according to claim 10, wherein said interconnecting conductor has a first straight portion and a second serpentine portion.

12. An LCD panel according to claim 2, wherein said plurality of parallel control lines comprises one of a plurality of gate lines or a plurality of data lines.

13. A liquid crystal display (LCD) panel having a plurality of pixel electrodes and a plurality of thin film transistors, comprising:

a substrate;

an array of LCD elements on said substrate, said array comprising a plurality of rows and columns;

a bonding pad area on said substrate including a plurality of bonding pads therein; and a plurality of interconnecting conductors on the substrate, a respective one of which connects a respective bonding pad in the bonding pad area to a respective LCD element of a row of LCD elements, said plurality of interconnecting conductors being configured and having a width selected to provide a uniform resistance between the bonding pads and the LCD elements of said one row of LCD elements connected thereto, wherein said plurality of interconnecting conductors extend from said bonding pad area in a fanned configuration, wherein a respective one of said plurality of conductors has a respective width, and wherein the width of said [interconnected] *interconnecting* conductors decreases towards a medial portion of said fanned configuration,

*wherein an interconnecting conductor of said plurality of interconnecting conductors has a length selected to provide said uniform resistance, and*

*wherein said interconnecting conductor comprises a serpentine portion.*

14. An LCD panel according to claim 13, wherein an interconnecting conductor of said plurality of interconnecting conductors comprises a material selected to provide said uniform resistance.

15. An LCD panel according to claim 13, wherein an interconnecting conductor of said plurality of interconnecting conductors comprises a first portion comprising a first material having a first resistivity and a second portion comprising a second material having a second resistivity different from said first resistivity.

16. An LCD panel according to claim 15, wherein said first and second portions have respective first and second lengths selected to provide said uniform resistance.

17. An LCD panel according to claim 16, wherein at least one of said first and second portions has a serpentine portion.

[18. An LCD panel according to claim 13, wherein an interconnecting conductor of said plurality of interconnecting conductors has a length selected to provide said uniform resistance.]

[19. An LCD panel according to claim 18, wherein said interconnecting conductor comprises a serpentine portion.]

20. An LCD panel according to claim [19] *13*, wherein said interconnecting conductor has a first straight portion and a second serpentine portion.

*21. A display panel having a plurality of pixel electrodes and a plurality of thin film transistors, comprising:*

*a substrate;*

*a plurality of parallel control lines connected to the thin film transistors on said substrate;*

*a bonding pad area on said substrate including a plurality of bonding pads therein; and*

*a plurality of interconnecting conductors, a respective one of said plurality of interconnecting conductors connect-*

*ing a respective bonding pad in said bonding pad area to a respective one of said plurality of parallel control lines,*

*wherein said plurality of interconnecting conductors extend from said bonding pad area in a fanned configuration, and at least one of said plurality of interconnecting conductors has a serpentine portion.*

*22. A display panel of claim 21, wherein said at least one of said plurality of interconnecting conductors further has a straight portion.*

*23. A display panel of claim 21, wherein at least another of said plurality of interconnecting conductors has a straight portion.*

*24. A display panel of claim 23, wherein said straight portion is located at the outer side of said serpentine portion.*

*25. A display panel of claim 21, wherein said at least one of said interconnecting conductor has a wavelike or ridged shape.*

*26. A display panel of claim 21, wherein said plurality of control lines comprises a plurality of gate lines and a plurality of data lines.*

*27. A display panel having comprising:*

*a substrate;*

*a plurality of pixel electrodes over said substrate;*

*a plurality of control lines over said substrate, the control lines electrically connected to said plurality of pixel electrodes and a plurality of thin film transistors;*

*a bonding pad area on said substrate including a plurality of bonding pads therein; and*

*a plurality of interconnecting conductors over said substrate, a respective one of which connects a respective bonding pad in said bonding pad area to a respective one of said plurality of control lines,*

*wherein said plurality of interconnecting conductors extend from said bonding pad area in a fanned configuration, and lengths of respective ones of said plurality of interconnecting conductors increase towards a medial portion said fanned configuration,*

*wherein said respective one of said plurality of interconnecting conductors further has a straight portion and a serpentine portion.*

*28. A display panel of claim 27, wherein said serpentine portion comprising a first material having a first resistivity and said straight portion comprising a second material having a second resistivity different from said first resistivity.*

*29. A display panel of claim 28, wherein the lengths of said serpentine portion and said straight portion and the resistance associated therewith given by*

$$Kx+(a-x)=b;$$

$$K \geqq b/a1;$$

*and*

$$a \geqq x,$$

*where K represents a resistivity ratio of the first material to the second material, a represents the length of said respective one of said interconnecting conductors, b represents the length of the longest one of said interconnecting conductors, a1 represents the length of the shortest one of said interconnecting conductors, and x represents the length of the serpentine portion.*

*30. A display panel of claim 27, wherein said respective one of said interconnecting conductor has a wavelike or ridged shape.*

*31. A display panel of claim 27, wherein said plurality of control lines comprises a plurality of gate lines and a plurality of data lines.*

*32. A display panel comprising:*

*a substrate;*

*a plurality of parallel control lines connected to the thin film transistors on said substrate; a bonding pad area on said substrate including a plurality of bonding pads therein; and*

*a plurality of interconnecting conductors, a respective one of said plurality of interconnecting conductors connecting a respective bonding pad in said bonding pad area to a respective one of said plurality of parallel control lines,*

*wherein said plurality of interconnecting conductors extend from said bonding pad area in a fanned configuration, and at least one of said plurality of interconnecting conductors has a first portion and a second portion having differing resistivities, and*

*wherein said at least one of said interconnecting conductors has a wavelike or ridged shape.*

*33. A display panel of claim 32, wherein said first portion and said second portion comprises different materials.*

*34. A display panel of claim 33, wherein said first portion comprises chrome.*

*35. A display panel of claim 34, wherein said second portion comprises aluminum.*

*36. A display panel of claim 32, wherein said first portion and said second portion are straight.*

*37. A display panel of claim 36, wherein said first portion is serpentine, and said second portion is straight.*

*38. A display panel of claim 32, wherein said plurality of control lines comprises a plurality of gate lines and a plurality of data lines.*

*39. A display panel of claim 1, wherein said plurality of control lines comprises a plurality of gate lines and a plurality of data lines.*

*40. A display panel of claim 13, wherein said plurality of control lines comprises a plurality of gate lines and a plurality of data lines.*

*41. A display panel having a plurality of pixel electrodes and a plurality of thin film transistors, comprising:*

*a substrate;*

*a plurality of parallel control lines connected to the thin film transistors on said substrate;*

*a bonding pad area on said substrate including a plurality of bonding pads therein; and*

*a plurality of interconnecting conductors, a respective one of said plurality of interconnecting conductors connecting a respective bonding pad in said bonding pad area to a respective one of said plurality of parallel control lines,*

*wherein said plurality of interconnecting conductors extend from said bonding pad area in a fanned configuration, said plurality of interconnecting conductors comprise a first conductor and a second conductor, and said first conductor has a wavelike portion and said second conductor is rectilinear.*

*42. A display panel of claim 41, wherein said plurality of interconnecting conductors further comprises a third conductor that is rectilinear and has a width different from a width of said second conductor.*

*43. A display panel of claim 42, wherein the width of said third conductor is greater than the width of said second conductor, and said third conductor are disposed farther than said second conductor from a medial portion of said fanned configuration.*

*44. A display panel of claim 41, wherein said plurality of interconnecting conductors further comprises a third con-*

*ductor that has a wavelike portion that has an amplitude different from an amplitude of the wavelike portion of said first conductor.*

*45. A display panel of claim 44, wherein the amplitude of the wavelike portion of said third conductor is smaller than the amplitude of the wavelike portion of said first conductor, and said third conductor is farther than said first conductor from a medial portion of said fanned configuration.*

*46. A display panel of claim 45, wherein said second conductor is farther than said third conductor from a medial portion of said fanned configuration.*

*47. A display panel of claim 41, wherein said second conductor is farther than said first conductor from a medial portion of said fanned configuration.*

*48. A display panel having a plurality of pixel electrodes and a plurality of thin film transistors, comprising:*

*a substrate;*

*a plurality of parallel control lines connected to the thin film transistors on said substrate;*

*a bonding pad area on said substrate including a plurality of bonding pads therein; and*

*a plurality of interconnecting conductors, a respective one of said plurality of interconnecting conductors connecting a respective bonding pad in said bonding pad area to a respective one of said plurality of parallel control lines,*

*wherein said plurality of interconnecting conductors extend from said bonding pad area in a fanned configuration, said plurality of interconnecting conductors comprise a first conductor and a second conductor, each of said first conductor and said second conductor having a wavelike portion, and an amplitude of the wavelike portion of the first conductor is different from an amplitude of the wavelike portion of the second conductor.*

*49. A display panel of claim 44, wherein the amplitude of the wavelike portion of said second conductor is smaller than the amplitude of the wavelike portion of said first conductor, and said second conductor is farther than said first conductor from a medial portion of said fanned configuration.*

*50. A display panel having a plurality of pixel electrodes and a plurality of thin film transistors, comprising:*

*a substrate;*

*a plurality of parallel control lines connected to the thin film transistors on said substrate;*

*a bonding pad area on said substrate including a plurality of bonding pads therein; and*

*a plurality of interconnecting conductors, a respective one of said plurality of interconnecting conductors connecting a respective bonding pad in said bonding pad area to a respective one of said plurality of parallel control lines,*

*wherein said plurality of interconnecting conductors extend from said bonding pad area in a fanned configuration, said plurality of interconnecting conductors comprise a first conductor and a second conductor, each of said first conductor and said second conductor having a wavelike portion, and a shape of the wavelike portion of the first conductor is different from a shape of the wavelike portion of the second conductor.*

*51. A display panel having a plurality of pixel electrodes and a plurality of thin film transistors, comprising:*

*a substrate;*

*a plurality of substantially parallel control lines connected to the thin film transistors on said substrate;*

*a bonding pad area on said substrate including a plurality of bonding pads therein; and*

*a plurality of interconnecting conductors, a respective one of said plurality of interconnecting conductors connecting a respective bonding pad in said bonding pad area to a respective one of said plurality of substantially parallel control lines,*

*wherein said plurality of interconnecting conductors extend from said bonding pad area in a fanned configuration, said plurality of interconnecting conductors comprise a first conductor group and a second conductor group, and said first conductor group comprises wavelike conductors and said second conductor group comprises rectilinear conductors.*

*52. A display panel of claim 41, wherein said rectilinear conductors comprise widths different from each other.*

*53. A display panel of claim 42, wherein said first conductor group is disposed around a medial portion of said fanned configuration and said second conductor group is disposed around outer portions of said fanned configuration.*

*54. A display panel having a plurality of pixel electrodes and a plurality of thin film transistors, comprising:*

*a substrate;*

*a plurality of substantially parallel control lines connected to the thin film transistors on said substrate;*

*a bonding pad area on said substrate including a plurality of bonding pads therein; and*

*a plurality of interconnecting conductors, a respective one of said plurality of interconnecting conductors connecting a respective bonding pad in said bonding pad area to a respective one of said plurality of substantially parallel control lines,*

*wherein said plurality of interconnecting conductors extend from said bonding pad area in a fanned configuration, said plurality of interconnecting conductors comprise a first conductor group and a second conductor group, and said first conductor group comprises wavelike conductors and said second conductor group comprises rectilinear conductors,*

*wherein said first conductor group is disposed around a medial portion of said fanned configuration and said second conductor group is disposed around outer portions of said fanned configuration, and*

*wherein a respective one of said rectilinear conductors has a respective width and the widths of said rectilinear conductors decrease towards a medial portion of said fanned configuration.*

* * * * *